United States Patent

[11] 3,577,836

| [72] | Inventor | Raymond M. Tamura<br>3253 N. Nimitz Hwy., Honolulu, Hawaii 96819 |
|---|---|---|
| [21] | Appl. No. | 875,770 |
| [22] | Filed | Nov. 12, 1969 |
| [45] | Patented | May 11, 1971<br>Continuation-in-part of application Ser. No. 545,446, Apr. 26, 1966, now abandoned. |

[54] ARMORED GARMENT
14 Claims, 9 Drawing Figs.

[52] U.S. Cl. ................................................. 2/2.5,
161/404
[51] Int. Cl. .................................................. F41h 1/02
[50] Field of Search ....................................... 2/2, 2.5;
109/80, 81; 161/404, 53, 68, 54, 119, 159, 120,
160, 127; 89/36 (A); 152/199, 178—179

[56] References Cited
UNITED STATES PATENTS

| 787,065 | 4/1905 | White ........................ | (89/36A) |
| 2,316,055 | 4/1943 | Davey ........................ | 89/36 |
| 2,332,464 | 10/1943 | Pissarevsky ................ | 109/81 |
| 2,738,297 | 3/1956 | Pfistershammer .......... | 161/127 |
| 2,768,919 | 10/1956 | Bjorksten et al. .......... | 2/2.5X |
| 2,952,579 | 9/1960 | Merriman ................... | 161/68 |
| 3,211,253 | 10/1965 | Gonzalez .................... | (161/68UX) |
| 3,255,062 | 6/1966 | Wilkins ...................... | 161/68 |
| 3,395,067 | 7/1968 | Lane .......................... | 161/119 |
| 3,431,818 | 3/1969 | King .......................... | 89/36 |

*Primary Examiner*—Jordan Franklin
*Assistant Examiner*—George H. Krizmanich
*Attorney*—Dennison, Dennison, Townshend & Meserole ABSTRACT: A laminated armor construction formed of a plurality of layers adapted to protect against missiles by a combination of projectile deflection, diffusion of forces, dissipation of energy into heat, modification of force vectors and adsorption of kinetic energy. A first layer of elliptical plastic plates causes deflection with the energy dissipation and adsorption being achieved by underlying layers of foam plastic, and a metal honeycomb filled with epoxy.

Patented May 11, 1971

INVENTOR
RAYMOND M. TAMURA

BY Jennison & Jennison

ATTORNEYS

INVENTOR
RAYMOND M. TAMURA

ATTORNEYS

ARMORED GARMENT

The present application is a continuation-in-part of my earlier application Ser. No. 545,446, filed Apr. 26, 1966, now abandoned.

This invention relates to protective body armor and more particularly to a laminated armor construction of the type which may be worn by individual persons and which provides protection against flying missiles such as bullets, shrapnel, and the like, and which absorbs the impact of such projectiles.

All protective armor of the personal type is designed as a compromise between a relatively light weight garment which will permit the user to move about without undue hindrance and yet one with the ability to stop and absorb shock from projectiles. Unfortunately, with the relatively heavy materials presently being used, and with the advent of larger projectiles and bullets having higher muzzle velocity, it has not been feasible to design a garment to provide adequate mobility which will protect the wearer against such projectiles.

In order to provide an efficient impact absorber, such as the type required in personal armor, it is required that the force of the projectile be distributed over the largest possible area.

It is an object of the present invention therefore to provide an armored garment suitable for use by individual persons which is relatively light in weight and yet will protect the wearer from the impact of projectiles.

It is another object of my invention to provide a new and improved armored garment which affords maximum flexibility and ease of movement to the wearer without sacrificing ballistic protection of the vital body areas.

Still another object of the invention is to provide new and improved body armor which may be manufactured relatively cheaply and with existing machinery.

Yet another object is to provide body armor which will actually protect the user against 20 mm. canon and armor-piercing projectiles with the same energy as a 20 mm. canon.

Another object of the invention is to provide a new and improved armored garment of the character indicated which is formed from a plurality of layers of dissimilar configuration and materials, and which will protect the user by a combination of projectile deflection, diffusion, and dissipation of kinetic energy to heat, and the modification of force vectors and adsorption of kinetic energy in the progressive destruction of the armored elements.

Other objects will become more apparent from a detailed study of the drawings and the following detailed description in which similar reference characters refer to like parts, and in which.

Figure 1:
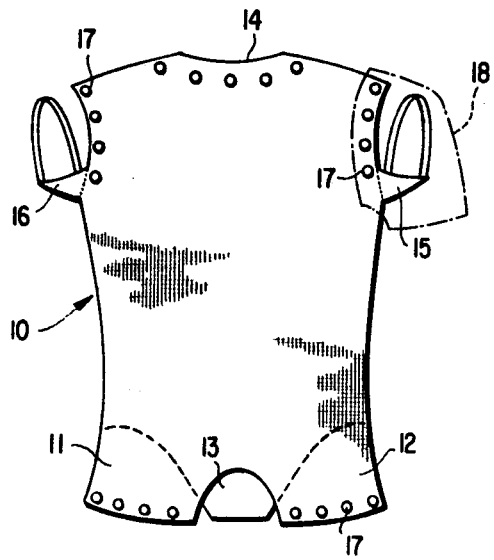
FIG. 1 is a rear view of a typical body garment formed of the armor material described herein and showing in dotted lines the addition of shoulder protectors.

A typical armored garment formed from materials disclosed herein is shown generally at 10 in FIG. 1 which is in the form of a torso vest having extending inguinal segments and buttock covering portions 11 and 12. The front of the garment will have a downwardly extending pelvic segment 13, as shown in FIG. 1. It will be understood that the garment is of the wraparound type and may have fasteners of conventional form on the sides or elsewhere as desired. The top of the garment is provided with a neck opening 14 and in the torso area armpit segments 15 and 16 are incorporated to protect the vital areas underneath the arm where there exist various nerves and major blood vessels passing to and from the upper extremities. The inguinal and buttock segments 11 and 12 and the pelvic portion 13 will prevent entrance of missiles into the abdominal cavity and the pelvic cavity. Injury is prevented at the inguinal region to the major nerves and the blood vessels which enter the pelvis. The buttock segments prevent injury to nerves and vessels at the buttock.

Snap fasteners or the like 17 are provided at various portions of the torso garment to permit selective attachment of various accessory armored protectors. For example, shoulder attachments 18, as shown by dotted lines in FIG. 1, may be secured into position to protect the upper portions of the arm and shoulder, while still permitting flexibility of the garment.

It should be understood that the area of fastening of the garment together, as along the side, may be provided with a flap or covering also formed of the armored material in order to provide maximum protection with no weak areas.

Figure 1A:
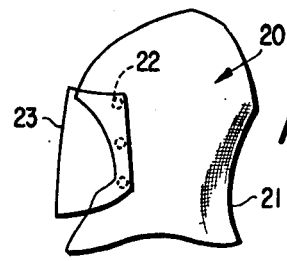
FIG. 1a is a side view of a typical body helmet formed of the armor material disclosed herein.

A hood as shown in FIG. 1a at 20 may be provided for maximum protection of the upper body and includes a neck and shoulder skirted segment 21 having an annular border and provided on the inside thereof with snap fasteners in order to join the same to the neck opening 14 by the inner connection of the snap fastening members 17 thereon. The hood may be worn in place of the conventional steel combat helmet and the same provides a much greater degree of protection and is lighter. The hood preferably is provided with snap fastening means 22 for the attachment of a transparent plastic faceplate of heavy duty armor quality 23. Such faceplate may, if desired, be tinted to provide protection against sun glare.

Figure 1B:
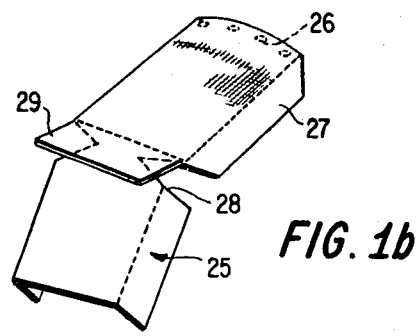
FIG. 1b shows a typical knee or elbow joint formed of the armor material disclosed herein.

In FIG. 1b there is depicted an extremity garment 25, which for example may be attached to the fastener means 17 on the inguinal supports 11 and 12 to protect the upper portion of the legs, the thigh and the knee. For purposes of attachment, snap fasteners 26 or the like may be employed. It will be noted that the extremity garments include depending side portions as shown at 27 and an elbow or knee joint crease 28 to permit flexibility. The joint crease is covered by a flexible flap 29 to provide complete protection. It will be understood that a similar extremity garment attachment may be used for the elbow to provide complete body protection. The extremity garment is adapted to be wrapped about the upper and lower extremities and snap fasteners, not shown, on the sides thereof may be employed for fastening after the same is wrapped about the limb to complete the encirclement of the extremity.

It will be apparent from the above that the torso garment described is designed to offer protection to the torso and vital areas of the lower extremities where major blood vessels are located. The inguinal and pelvic segments 11, 12 and 13 protect the area where the femoral artery, veins and nerves are located near the surface and where injury could lead to very rapid loss of blood and where effective application of tourniquets cannot be made. The buttock segment protects the area where the sciatic nerve and its accompanying blood vessels leave the pelvis. While I have shown the use of snap fasteners, it should be understood that zippers or Velcro fasteners or the like may be applied to the sides of the torso garment for rapid removal of the same should, for example, the wearer be immersed in deep water and require immediate removal of the armor.

Figure 2:
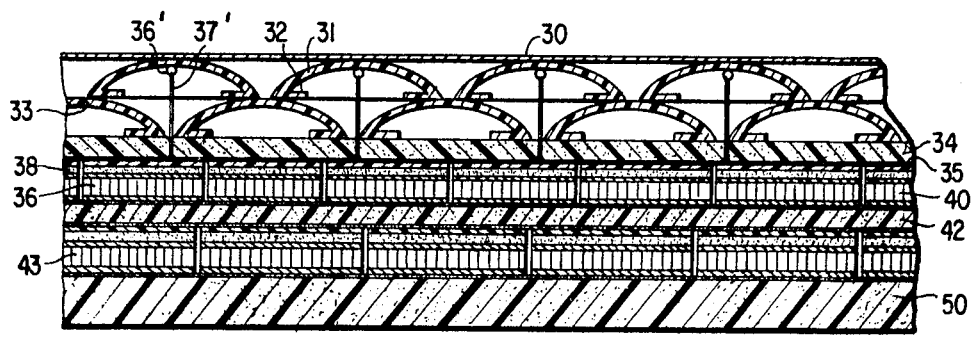
FIG. 2 is a typical cross-sectional view showing the layers of material incorporated in the body garment of FIG. 1.

The internal garment construction may be better understood by reference specifically to FIG. 2. The outer layer 30 of the garment 10 is preferably a thin fabric such as nylon cloth. Various fabrics such as Dacron, or rubberized material, may be used, depending upon the climate and the circumstances. It is also contemplated that such material may be printed in a camouflage pattern if desired.

Immediately beneath the outer cover or layer 30 are a plurality of plastic plates 31 formed from polytetrafluoroethylene, commonly known under the trademark Teflon, which material is noted for its extremely low coefficient of friction. The plates 31 are circular in frontal view and may have a diameter of from 1½ to 3 inches. In cross section, as shown in FIG. 2, the plates are ellipticallike with a height of from one-fourth inch to one-half inch. Preferably, the Teflon plates will have a wall thickness of one-eighth inch and will have an inturned rear flange 32 which serves as a bearing member on another series of plates 33 later to be described.

Located immediately therebeneath is an additional series of similar Teflon plates 33 having rear inturned flanges 32 formed in a staggered relationship with the plates 31 so that there is always an overlap between the plates in the two different layers. The rear faces of the plates 33 rest on a continuous layer of polyurethane foam 34 having a thickness of approximately one-fourth inch. The plates 33 which are apposed to the surface of the foam 34 will be glued thereto as by epoxy resin. A rear cover of nylon material 35 is secured to the posterior face of the foam material 34. To prevent movement and dislodging of the plates, the top series of Teflon plates 31 are provided on their interior with an eyelet 36' to which is attached a tie line 37' which passes through the foam layer 34 and is tied down to the posterior nylon cover 35.

Figure 5:
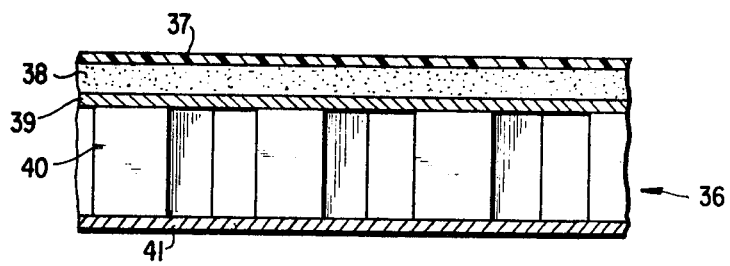
FIG. 5 is an enlarged view of the outermost honeycomb layer in FIG. 2.

Located immediately beneath the nylon cloth cover 35 and secured thereto is a first layer of honeycomb units shown generally at 36. These honeycomb units are in the form of squares, each preferably 3 inches along each side as shown more clearly in FIG. 5. Each of these squares may be secured to the posterior side of the cover of the nylon material 35 by epoxy resin or the like. The honeycomb units 36 each comprise a lamination of three layers including a top 1/16-inch sheet of Teflon 37 which functions in a manner similar to the elliptical shells or plates 31 and 33. This plastic sheet is backed by a layer of mixed epoxy adhesive and filaments of boron, carbon, or other similar material which are arranged in a crosshatch manner, as shown at 38. A thin aluminum sheet of preferably 1/16-inch thickness 39 forms the anterior surface of the metal honeycomb. The epoxy material serves to keep the plastic adherent to the 1/16-inch aluminum sheet. The combination of the Teflon plastic sheet, the epoxy and boron, and the aluminum sheet form an extraordinarily strong protective armor layer. The honeycomb elements themselves 40 are generally similar to the type of structural cores sued in aircraft construction and include walls of the order of one-sixteenth inch in thickness with the cross-sectional diameter between parallel walls on the order of one-fourth inch. The cross-sectional configuration of the honeycomb is hexagonal although of course any conventional geometrical configuration could be used if desired. The cells of the honeycomb 40 are filled, preferably with a slurry of epoxy and boron or carbon filaments, preferably one-eighth inch in length. The filaments and the epoxy are mixed in a ratio of 1:1 by weight. The function of this cell filling will be apparent later in the discussion. The posterior of the honeycomb is covered by an aluminum sheet 41 of a preferred thickness of three thirty-seconds inch. The two aluminum sheets 39 and 41 may either be brazed or adhesively secured to the honeycomb members 40 with epoxy. Each of the honeycomb units in the 3×3 size as shown at 36, since they are glued to the cloth layer 35, will be effectively prevented from sliding and overlapping. Although the plates or units 36 are shown somewhat spaced from each other laterally for the sake of clarity, the same are preferably butted against the sides of adjoining units.

Backing up the honeycomb units 36 is a ½-inch thick sheet of polyurethane foam 42. The anterior surface of this material 42 may be covered again with a nylon or similar material cover, not shown, to which the rear aluminum face 41 of the honeycomb elements 36 may be secured as by epoxy.

Figure 6:
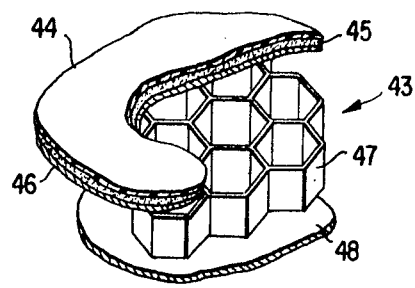
FIG. 6 is a fragmentary perspective with parts shown in section showing the innermost honeycomb layer of FIG. 2.

Posterior of the foam layer 42 is an additional series of plates or units shown at 43 and depicted in greater detail in FIG. 6. Each of the honeycomb units 43 is similar in construction to the honeycomb units 36, however the sizes are considerably different. The honeycomb units 43 are preferably 4×4 inches square and are secured by adhesive to the layer of foam 42 or an optional cloth posterior cover thereon. Here again the plates will be butt ended and preferably their respective joints will not vertically coincide with the joints of the units 36. The honeycomb units 43 include a 1/16-inch layer of Teflon 44, and a layer of epoxy and boron (or carbon) filaments similar to the units 36. The individual honeycomb elements themselves consist of a top aluminum plate 46 of three thirty-seconds -inch thickness. The individual honeycomb cells are shown at 47 and preferably have a cross-sectional dimension between parallel walls of one-half inch. Here again, each of the cells is filled with a slurry of epoxy and boron or carbon filaments. The posterior surface of the unit 43 is closed by a ⅛-inch sheet of aluminum 48. The posterior surface of each of the honeycomb units 43 is then secured to the anterior surface of a ¾-inch polyurethane foam layer 50. Although not shown, an inner layer of nylon material similar to the layer 30 may be provided to serve as a rear cover and act in conjunction with layer 30 as an envelope for all of the intermediate laminations. It will be noted that all of the individual rigid elements are arranged so that in adjacent layers the joints are always overlapped to present maximum protection to the wearer.

THEORY OF OPERATION

Protection is afforded by my new armor by utilizing principles of deflection, diffusion and dissipation of kinetic energy, conversion of kinetic energy to heat energy, modification of force vectors, and absorption of kinetic energy in the progressive destruction of the armor elements.

The Teflon discs or plates 31 and 33 accomplish the initial task of deflecting the projectile as it enters the garment. The discs have a very low coefficient of friction, an outstanding property of polytetrafluoroethylene, which thereby facilitates the deflection of the projectile. This action is demonstrated graphically in FIGS. 3 and 4. It has been found that penetration of any surface is most easily accomplished when the missile strikes that surface in an attitude which is normal or perpendicular to the surface at the point of contact. In the prior art where hemispherical surfaces are used, any radius of the surface would form a good penetration path and the missile can strike a hemispherical surface at an unlimited number of points and still be normal to the surface as long as its path coincides with any of an infinite number of radii in a hemispherical dome. With ellipticallike-shaped plates such as 31 and 33, there are only two points at which the missile can strike the surface and still be normal to the surface since an ellipse has only two radii. The probability of such a missile striking exactly along these two radii is on the order of 0.0000001.

Figure 3:
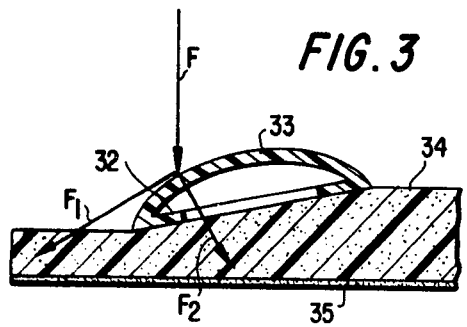
FIG. 3 is an enlarged fragmentary portion of FIG. 2 showing the effect of impact of a projectile on one of the plates.
Figure 4:
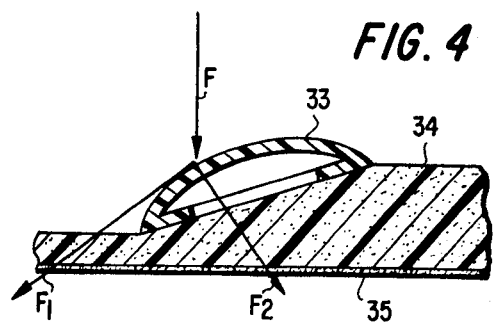
FIG. 4 is a view similar to FIG. 3 but showing further deformation of the plate and the underlying foam layer.

The quarter-inch polyurethane foam layer 34 also serves to deflect the missile since pressure on the ellipticallike plate will depress the plate into the foam as shown in FIGS. 3 and 4 wherein the left-hand corner surface of the rear flange 32 is being forced downwardly by application of the missile force F. As the plastic foam is being depressed, the primary force vector F of the missile is divided in customary fashion into two component vectors $F_1$ and $F_2$ which of course are each smaller in magnitude than the force vector F. It will be apparent that the vectors $F_1$ and $F_2$ will change directions as the plastic plate is being progressively depressed, as shown more specifically in FIG. 4, since the vector lines will tend to be displaced in a clockwise fashion as the foam layer 34 is depressed in the manner shown. This relieves pressure at the point of impact since $F_1$ and $F_2$ will have an ever increasing angle between them. Since the Teflon plastic has a very low coefficient of friction, the missile will tend to slip off the surface and will be deflected.

However, in the event the missile does penetrate the plastic shell, the kinetic energy will be decreased by the quantity of energy necessary to shatter the plastic shell. This can be shown by the equation $$K.E. = \frac{Wv^2}{2g} = 1/2 mv^2$$

where $m$ equals the mass of the missile and $v$ equals the velocity, W equals the weight of the missile and $g$ equals the force of gravity or approximately 32 feet per second per second.

Figure 7:
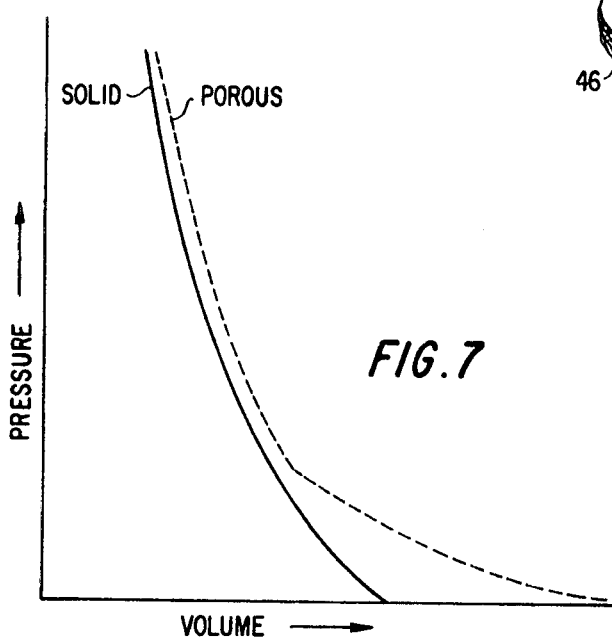
FIG. 7 is a plot of a Hugoniot curve of pressure versus volume.

Having an ellipticallike surface, the plastic shell plates will have a resiliency factor which will decrease the kinetic energy even further. Depression of the polyurethane foam 34 not only aids in the deflection, but the foam also serves to absorb kinetic energy according to the well-known Hugoniot curve illustrated in FIG. 7. The porous material has a lower rate of pressure increase which in turn means that the kinetic energy, in terms of pressure, is transmitted more slowly than in a solid. This phenomenon has a most important bearing on the armored garment. It is a known fact from human deceleration experiments conducted on test sleds that protection from injury depends on the third derivative of the distance equation, usually in terms of $g$ per second. The term, $g$, is of course the acceleration of gravity which is approximately 32 feet/sec$^2$. The deceleration experiments show that the human can be protected if the onset of $g$/sec is prolonged. It will be seen from a study of the Hugoniot curve in FIG. 7 that this is exactly what happens to shock waves; i.e., a 1-inch cube of polyurethane foam has a slower rate of pressure, Force per unit area, increase than a 1-inch cube of elastic material such as rubber of the type used in the Meyer U.S. Pat. No. 2,723,214, issued Nov. 8, 1955. Since $v=at$, where $t=$time, and since K.E.$=\frac{1}{2}ma^2t^2$, and F=force (poundals)$=m$ (pounds) a (feet/sec$^2$). Therefore, K.E.$=\frac{1}{2}Fat^2$ and $$F=\frac{2\ K.E.}{at^2}$$

From the last equation derived, it will be seen that if the time $t$ is increased, the force F is decreased. This agrees with the Hugoniot curve.

Referring to the first honeycomb units 36, it will be seen that the units are square and the center thereof is the intersection of the diagonals. Each of the individual honeycombs 40 will tilt if the missile, assuming the same passes that far, does not strike the plate of the honeycomb at its center. The 1/16-inch sheet of polytetrafluoroethylene plastic 37 will function in the same manner as in the ellipticallike shell and the same phenomenon of deflection will occur. Assuming that the missile here is not deflected and penetrates into the surface of the honeycomb member and the epoxy and boron or carbon material, the force $F_2$ will be decreased by a substantial amount. The function of the honeycomb and its filled interior is to increase the element $t$ so that F in the equation $$F=\frac{2\ K.E.}{at^2}$$

will be decreased even further. This is accomplished by the fact that the missile will crush the walls of the honeycomb slowly. The epoxy-carbon or boron slurry prevents splitting of the honeycomb cell by explosive energy of the type found in large 20 mm. canon rounds. The boron or carbon filaments add hardness to the honeycomb so that $t$ will be increased much more so than in the absence of such material.

The design of the armor as noted above is intended to capture the missile and not necessarily defeat it by disintegration and deformation so that the missile, by the time it reaches the posterior sheet of the 3×3 inch honeycombs 41, will have depressed the ½-inch polyurethane foam 42 which will absorb over half the kinetic energy according to the Hugoniot curve.

In the event that the first honeycomb units 36 fail to deflect or defeat the missile, the underlying 4×4 inch honeycomb elements 43 will function in the same manner. The larger area provided thereby will dissipate and absorb the final increment of kinetic energy. Here again, it will deflect such a missile assuming the same penetrates that far unless the missile strikes at the intersection of the diagonals which is unlikely. Since the elements of these larger honeycomb units are thicker, it will serve as a more effective means in absorbing the remaining energy.

The armor laminations described can be formed into a wide variety of shapes to conform to the various portions of the human body as above described and can also be used as protection for vehicles, fragile materials and equipment.

What I claim as my invention and desire to protect by Letters Patent of the United States is:

I claim:

1. Protective armor adapted to absorb the energy of a projectile formed from a plurality of superposed layers including:
    a. a first layer formed from a plurality of plastic plates having a curved outer surface, said plates being in side-by-side relation to each other;
    b. a second layer formed of a porous foamed plastic in contact with the rear surfaces of said plastic plates of the first layer;
    c. a third layer formed from a plurality of rigid walled honeycomb units, each unit having a multiplicity of polygonal cross section cells and having a top and bottom covering; and
    d. means to secure each layer to the next underlying layer.

2. Protective armor as defined in claim 1 and further including an additional layer formed from a plurality of plastic plates overlying said first layer, said plastic plates having a curved outer surface and being in side-by-side relation and being offset from the plates of said first layer to provide coverage of the space between adjacent plates of said first layer, and means to secure said plates of the additional layer to said second layer.

3. Protective armor as defined in claim 2, wherein said means to secure said plates comprises an eyelet on the interior of each of the plates of the additional layer and a tie line on each eyelet passing through said second layer and secured thereto.

4. Protective armor as defined in claim 2, wherein all of said plates are ellipticallike in cross section.

5. Protective armor as defined in claim 2, wherein all of said plates are formed of polytetrafluoroethylene.

6. Protective armor as defined in claim 4, wherein the plates of said first layer have a flat bearing surface on the rear thereof adapted to rest on said second layer.

7. Protective armor as defined in claim 1, and further including a fourth layer formed of a porous foamed plastic in contact with the rear covering of said honeycomb units.

8. Protective armor as defined in claim 7, and further including a fifth layer secured beneath said fourth layer and comprising a plurality of rigid walled honeycomb units, each unit having a multiplicity of polygonal cross section cells and having a top and bottom covering.

9. Protective armor as defined in claim 8, and further including a sixth layer formed of a porous foamed plastic.

10. Protective armor as defined in claim 9, and further including a fabric covering overlying said first layer.

11. Protective armor adapted to absorb the energy of a projectile formed from a plurality of superposed body covering layers including:
    a. a first deflective layer formed from a plurality of rigid curved plate means;
    b. a second layer formed from energy absorbing means;
    c. a third layer adapted to dissipate kinetic energy by deformation and conversion thereof, said third layer being formed from a plurality of rigid, walled honeycomb units, each unit having a multiplicity of polygonal cross section cells and having a top and bottom covering; and
    d. means to secure each layer to the next underlying layer.

12. Protective armor as defined in claim 11, wherein each honeycomb unit also includes a rigid layer of epoxy adhesive mixed with filaments of carbon or boron secured above said top covering.

13. Protective armor as defined in claim 12, and further including a sheet of polytetrafluoroethylene overlying said rigid layer.

14. Protective armor as defined in claim 11, wherein said cells are filled with a rigid mixture of epoxy adhesive and filaments of carbon or boron.